Nov. 13, 1956   G. L. OSWALT   2,770,346
PALLET FEEDER
Filed June 24, 1952   6 Sheets-Sheet 3
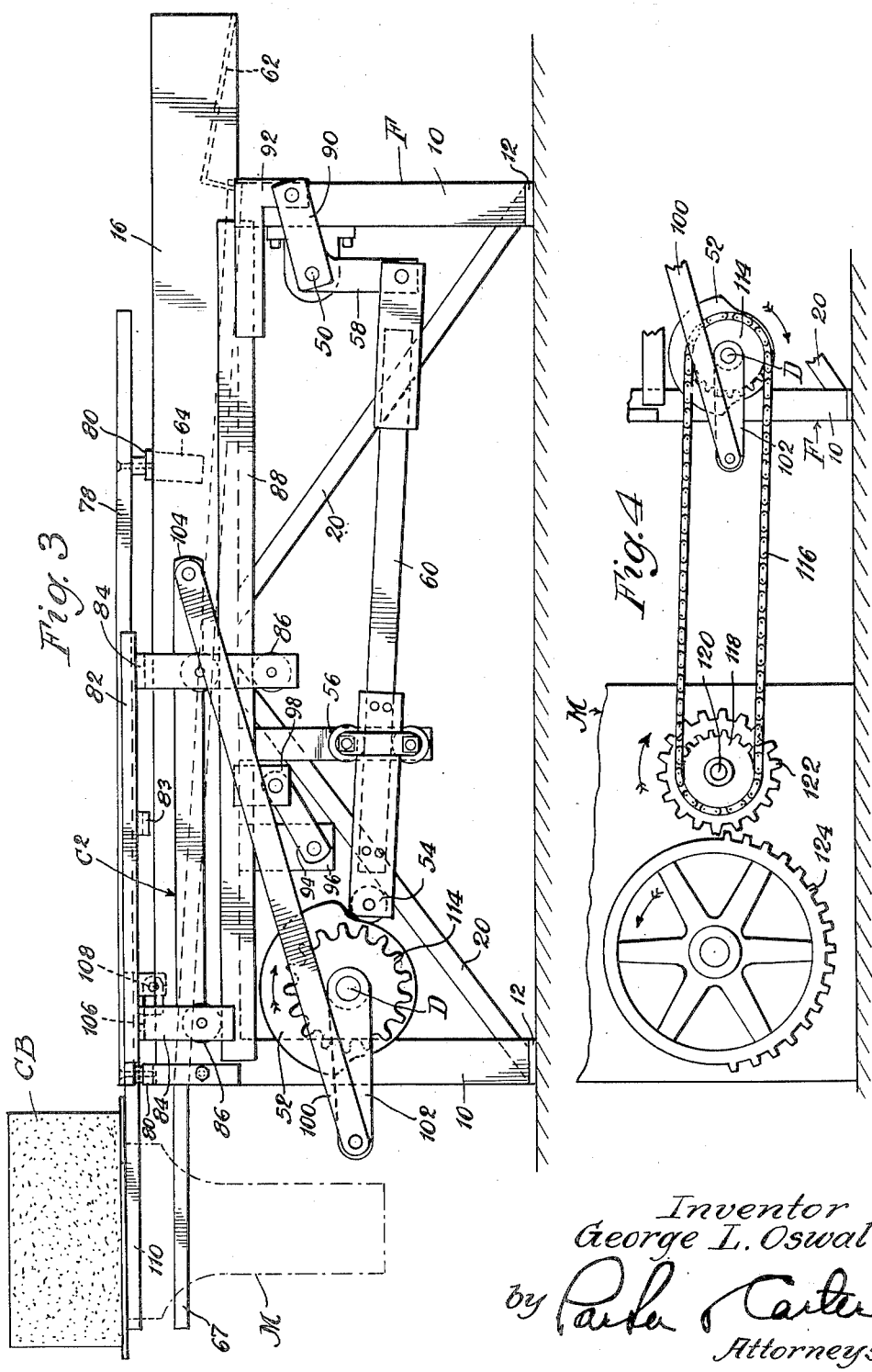
Inventor
George L. Oswalt
by Parker & Carter
Attorneys

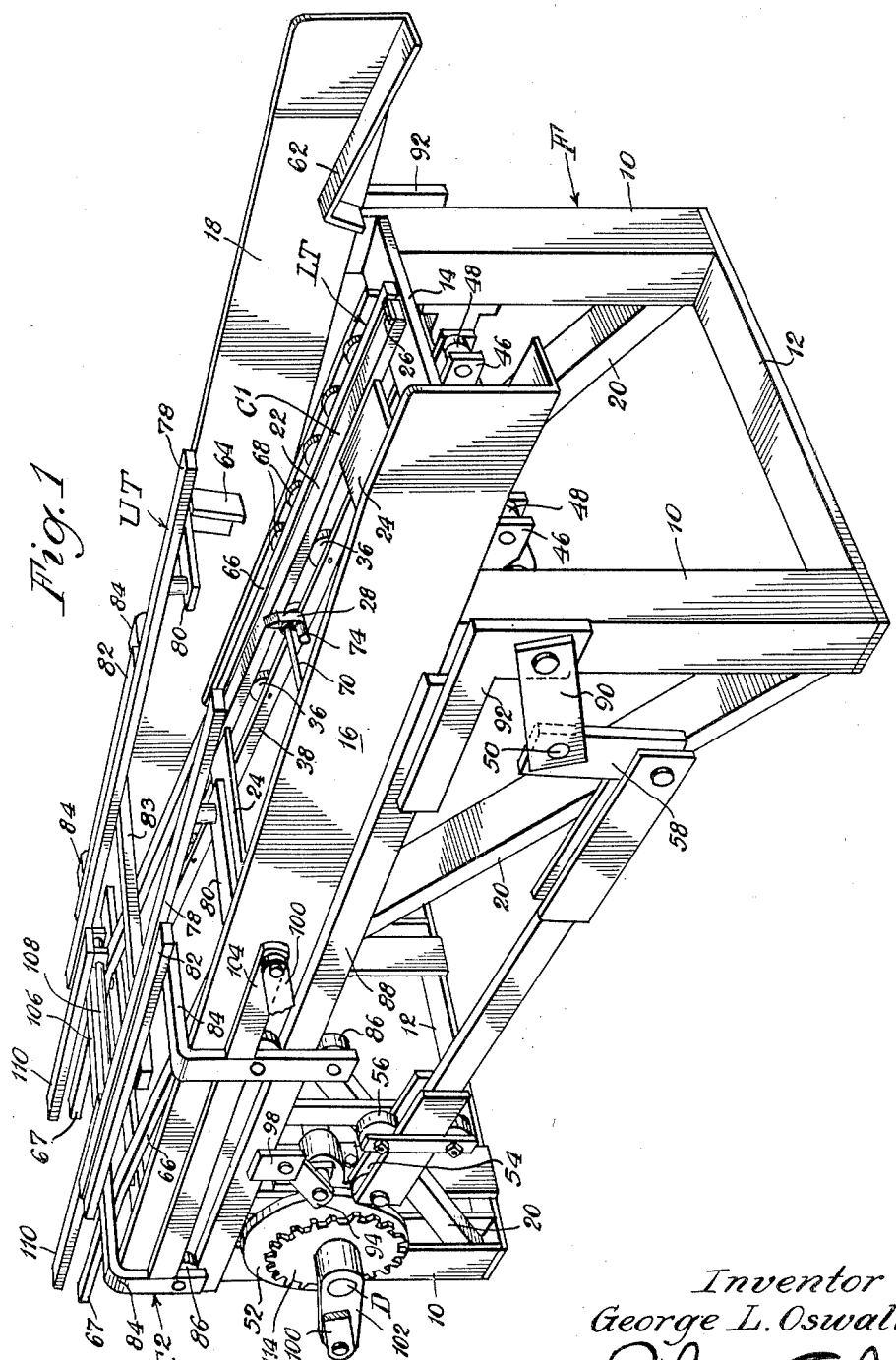

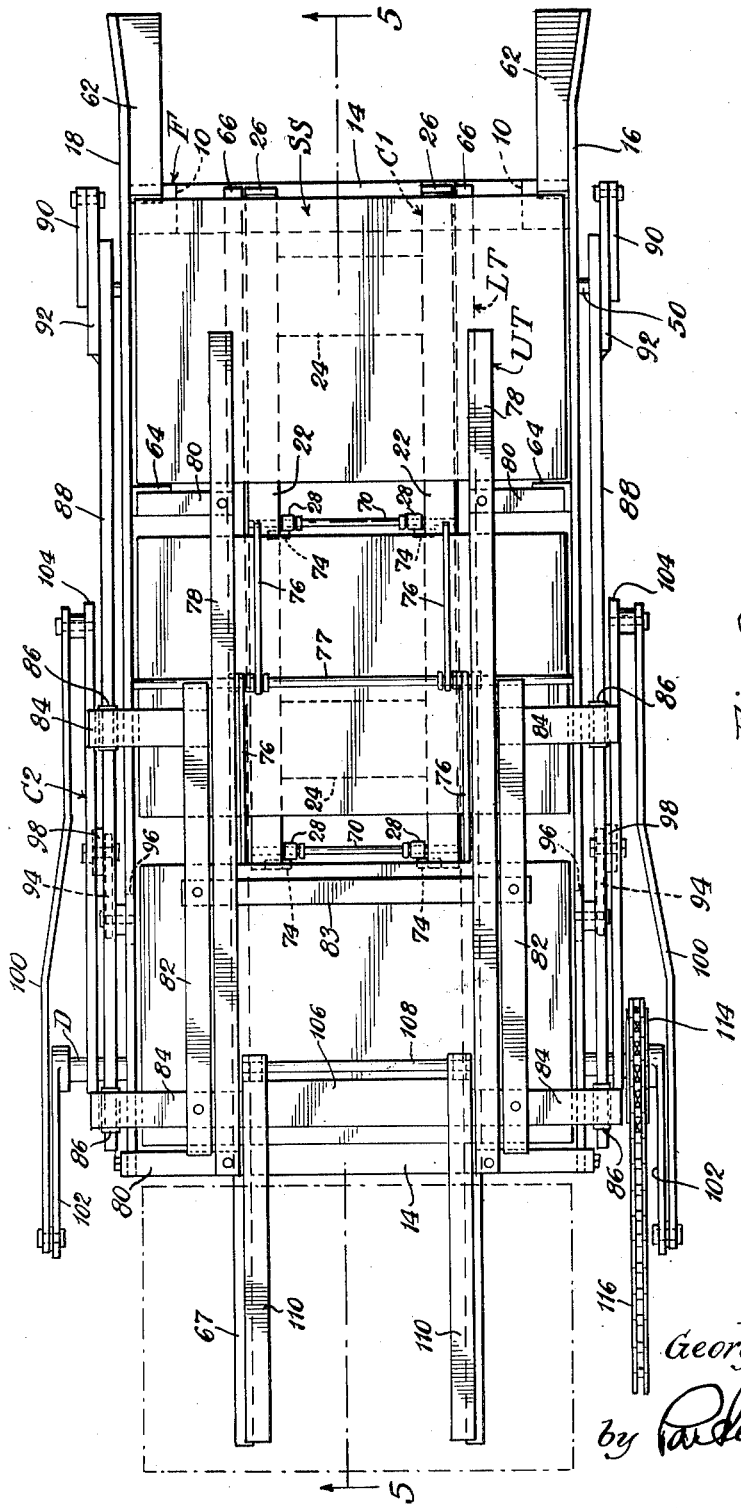

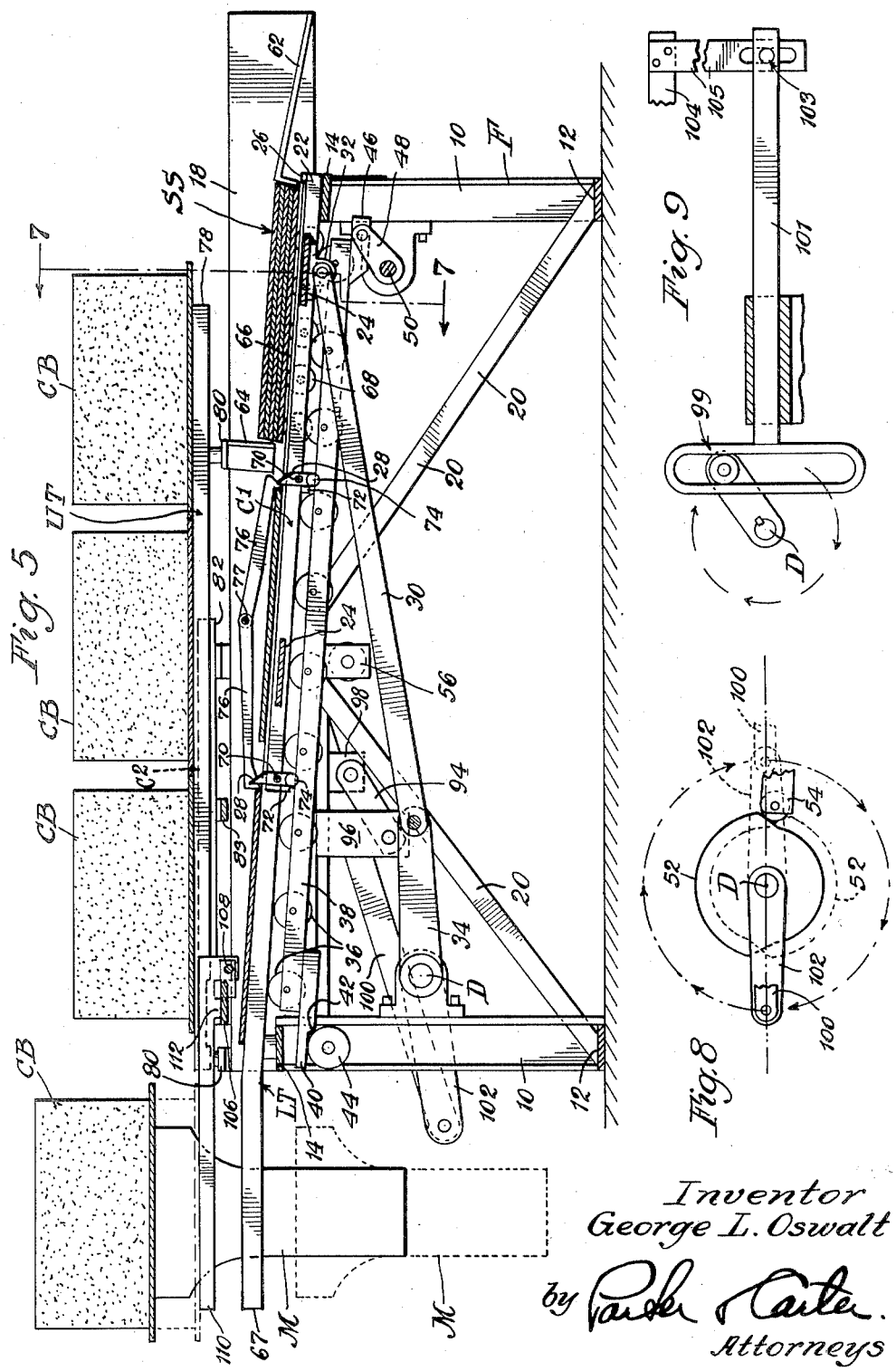

Nov. 13, 1956

G. L. OSWALT 2,770,346

PALLET FEEDER

Filed June 24, 1952

Inventor
George L. Oswalt
by Parker Carter
Attorneys

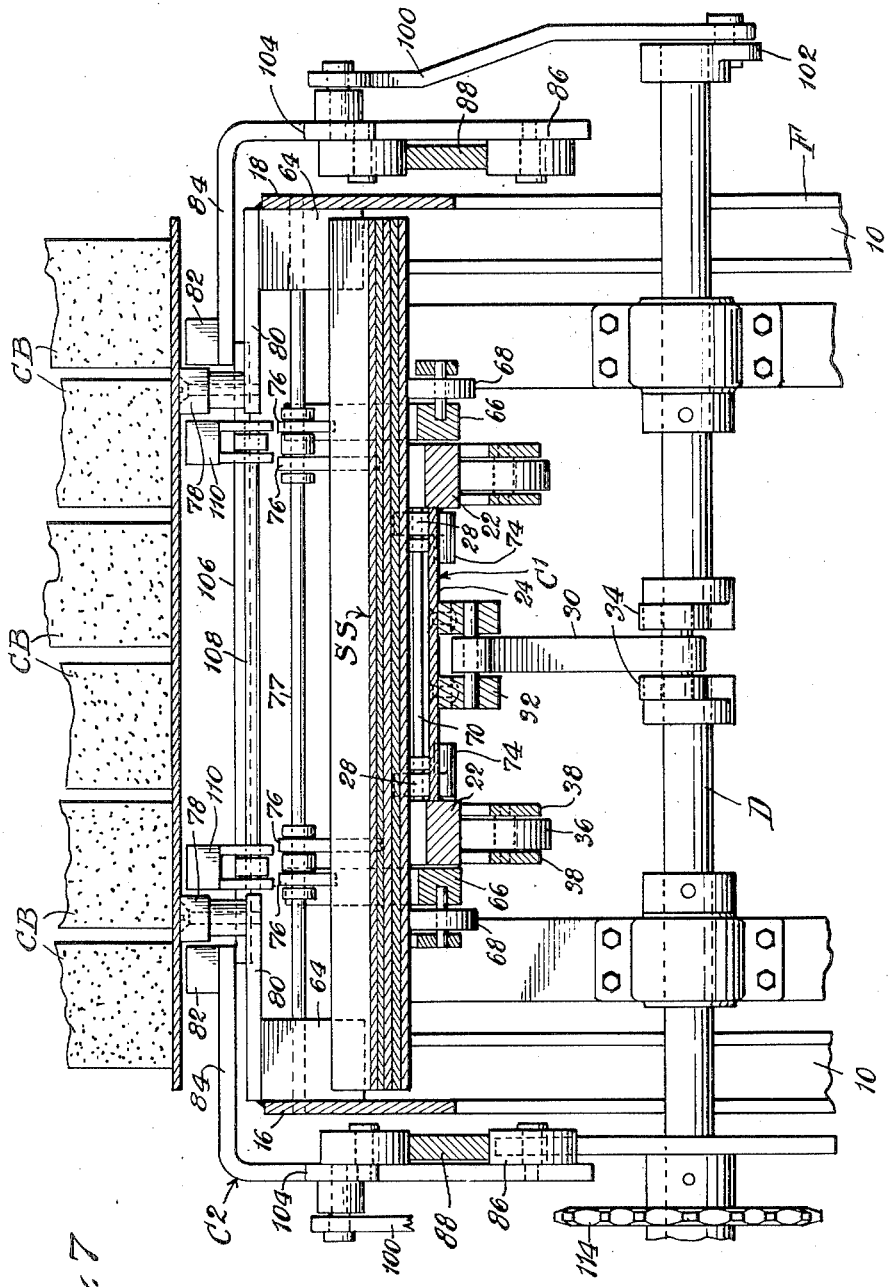

United States Patent Office 2,770,346
Patented Nov. 13, 1956

2,770,346

PALLET FEEDER

George L. Oswalt, Elmwood Park, Ill.

Application June 24, 1952, Serial No. 295,311

9 Claims. (Cl. 198—19)

My invention resides in the field of cinder block molding equipment and is an improvement on prior devices for handling cinder blocks in and around the conventional cinder block molding machines.

Conventional molding machines employ structures that mold cinder blocks on moving pallets conveying to and from the molding machine. These pallets in essence are nothing more than flat rectangular platforms made of any desired material such as wood, or a light metal. Prior to my invention these pallets have been fed on a chain conveyor into the molding machine from one side to a molding station where cinder blocks are molded, and the pallet and the block fed out of the machine on the opposite side along a roller track to a discharge station where they are picked up by hand or machinery, placed on a truck, and taken to a kiln. My invention is a pallet feeder for conveying empty pallets to the molding machine and removing the pallets and green cinder blocks from the molding machine all on the same side of the molding machine, the feeding action of the pallet feeder being in timed relationship with the operation of the molding machine.

The primary object of my invention is a pallet feeder for feeding empty and loaded pallets to and from a molding machine from the same side.

Another object is a pallet feeder in the form of two tracks, one superimposed above the other, empty pallets being fed along the lower track to the molding machine and loaded pallets being removed along the upper track to a cinder block handling device.

Another object is a common feeding mechanism for the two tracks that will feed empty pallets along the lower track and loaded pallets along the upper track at the same time but in opposite directions.

Another object is a carriage on each track for feeding pallets to and from the molding machine.

Another object is a feeding mechanism for the carriages on both tracks that results in a feeding and return stroke motion that approaches simple harmonic motion so that loading and unloading of the carriages occurs during the idle or dwell periods.

Another object is a new and improved drive for imparting intermittent reciprocatory motion to the carriages.

Other objects will appear from time to time in the ensuing specification and drawings in which:

Figure 1 is a perspective view showing my entire pallet feeder;

Figure 2 is a top plane view of the pallet feeder;

Figure 3 is a side elevation of the pallet feeder shown in Figure 1 with the molding machine diagrammatically illustrated to indicate its position relative to the pallet feeder;

Figure 4 is a side view, with parts omitted, showing a driving connection between the pallet feeder and the molding machine;

Figure 5 is a sectional view of the pallet feeder taken on line 5—5 of Figure 2, showing primarily the feeding carriage on the lower pallet track;

Figure 7 is a sectional view taken along line 7—7 of Figure 5; and

Figures 8 and 9 are diagrammatic views showing the feeding mechanism with its motion that approaches simple harmonic motion.

Figure 6:
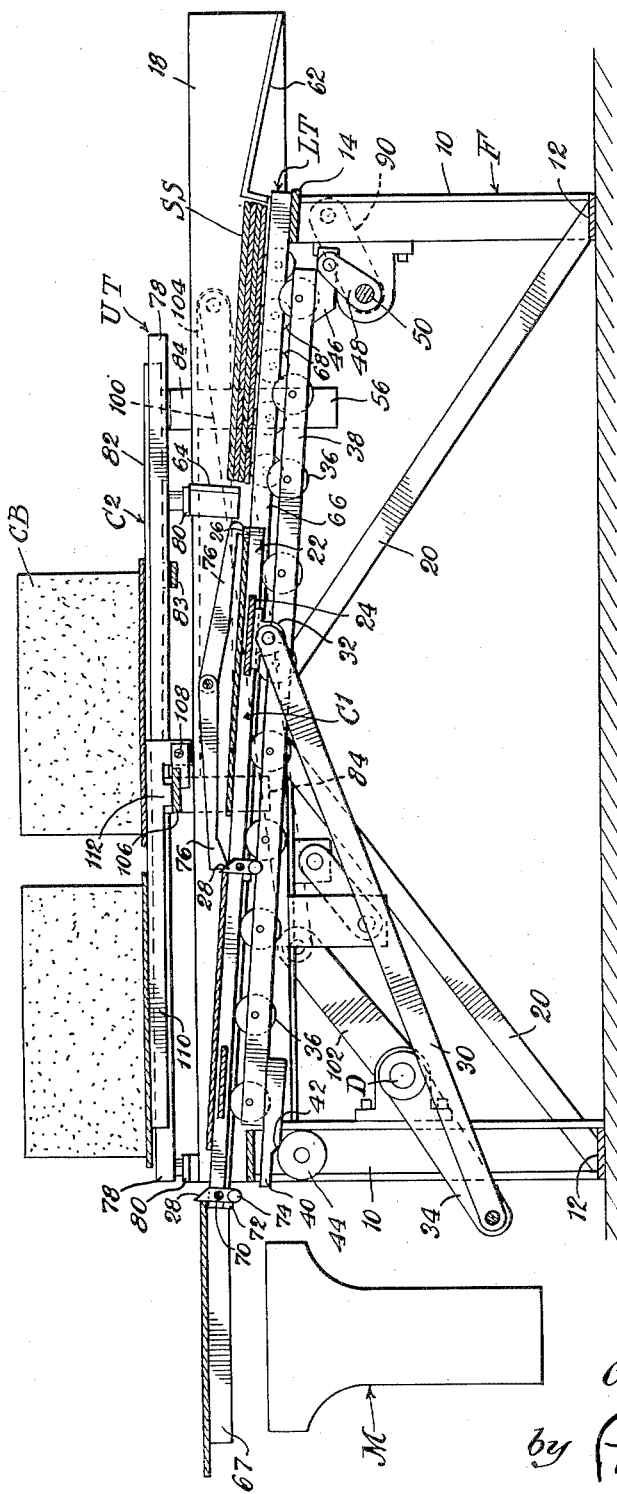
Figure 6 is a section similar to Figure 5 with parts in different positions.

In Figure 1 the frame of the pallet feeder is indicated generally by F and includes at least four upright stanchions or legs 10. The legs at either end are joined together at the bottom and top by flat horizontal members 12 and 14 respectively. The tops of the legs are secured to a pair of guides 16 and 18 running transversely along either side of the pallet feeder. Any type of appropriate reinforcing structure in the form of braces 20 is provided intermediate the legs and the side guides to properly stabilize and strengthen the entire unit.

As best shown in Figures 3, 4, 5, and 6 the upper portion of the frame has two tracks, one superimposed above the other, the lower track LT being in a slightly inclined position to feed empty pallets from a supply stack of pallets SS to a molding machine, diagrammatically indicated at M, and the upper track UT being superimposed above the lower track and used to feed cinder blocks CB from the molding mechanism to a discharge station. As the lower track LT leading from the supply stack SS is slightly inclined, the empty pallets are fed one at a time up a slight grade to the molding machine, whereas the upper track is disposed generally horizontally.

Both tracks are provided with carriages for feeding the pallets therealong and with an intermittent reciprocating driving mechanism that operates in timed relationship to the operations of the molding machine M.

A feeding carriage C–1 for the lower track LT is composed of side members 22 disposed generally longitudinally along the lower track and connected intermediate their ends by a pair of cross bracing pieces 24. As shown in Figure 2, these side pieces 22 reside well within the two guides 16 and 18 so as to assume an intermediate position. The lower carriage C–1 has a pair of pickers or upstanding lugs 26 on the rear edge of side members 22 and a pair of feeding elements in the nature of pawls 28 at its forward edge, see Figures 2 and 5, and intermediate its ends for feeding the empty pallets forward from the supply stack SS. A mechanism to be described hereinbelow reciprocates the lower feeding carriage C–1 along the lower track LT as well as raising and lowering it during its reciprocating movements so as to acquire a feeding action. The carriage is slightly raised above the level of the track on its feeding stroke forward toward the molding mechanism and is lowered slightly below the level of the track on its return stroke from the molding machine.

The lower track is composed of rails 66 and rollers 68 stationarily mounted with respect to the frame F and slightly inclined to the horizontal. The lower edges of the rails 66 are attached to the frame horizontal member 14 while the forward edges 67, see Figures 3 and 5, extend beyond the forward edge of the frame F across the molding station of the molding machine.

The mechanism for reciprocating the carriage C–1 backward and forward includes a link 30, best shown in Figures 5 and 7, connected to the rear edge of the carriage C–1 by a suitable bracket 32. This link is pivotally connected to a rotating lever or crank 34 which is nonrotatably mounted on a main drive shaft D. The mechanism that imparts intermittent rotation to the main drive shaft D, as shown in Figure 4, will be described hereinbelow.

The structure for elevating the carriage during its reciprocating movement includes a subcarriage with rollers 36 spaced along side guide members 38 which are movably supported at either end on the main frame F. The side members 22 of the reciprocating carriage C–1 ride directly on the rollers 36 so that a minimum of resistance is offered to the carriage C–1 as it is reciprocated back and forth. Attached to the forward edge of each of the side guides 38 are extensions 40 with a camming surface 42. The extensions 40 ride on rollers 44 rotatably mounted on the forward legs of the frame F so that the forward edge of the subcarriage is not directly connected but only rests on the rollers 44, and might be described as floating with relation to the main frame F. The rear edge of the subcarriage has a pair of extensions 46 connected to the side guide members 38, each of the extensions being pivotally secured to lever arms 48. Each of the lever arms is connected to a rock shaft 50, see Figures 1 and 5, which extends outwardly to the left side of the frame.

A control cam 52 in Figures 1 and 3 is mounted on the main drive shaft D and is used to elevate and lower the carriage C–1. The cam 52 is provided with a follower 54 that is supported by a roller bracket 56 depending from the main frame F. The bracket 56 allows the follower 54 to reciprocate back and forth longitudinally in response to the contours of the control cam 52. The follower 54 is connected to a lever arm 58 by a link 60 and the lever arm is secured to the rock shaft 50 so that the rock shaft 50 and the lever arm 58 are oscillated by the control cam 52.

In Figure 3, as the control cam rotates clockwise the follower 54 in conforming to the contours of the cam will rock the shaft 50, Figure 5, back and forth so as to oscillate the lever arms 48 thus raising and lowering the lower edge of the subcarriage as well as reciprocating it slightly along the lower track. As the subcarriage moves forward toward the molding machine, its forward extension 40 is raised by the cam surface 42 due to its slight movement forward, the entire subcarriage will be raised and lowered in a parallelogram type of action. Therefore carriage C–1 riding on rollers 36 of the subcarriage will also be raised and lowered as it reciprocates along the lower track LT.

The supply stack SS is formed by a pair of inclined guides 62 mounted on the inner faces of the frame guides 16 and 18. A pair of abutments 64 are attached also to the inside faces of the frame guides 16 and 18 so as to form a loading station, the abutments 64 being positioned from the inclined guides 62 a distance slightly greater than the length of a pallet, the abutments extending downward toward the lower track LT and allowing sufficient spacing between the lower edges of the abutments 64 and the lower track so that only one pallet at a time may pass.

The feeding pawls 28 positioned on the reciprocating carriage C–1 for the lower track are mounted on pivoted rods 70 extending transversely across the carriage. The carriage has stops 72 against which the feeding pawls are positioned by counterweights 74 so that the pawl is held in an upright position against the stop while the pallets are being fed to the molding machine. However, the pawls may rotate slightly counter-clockwise during the return movement of the carriage C–1 if they strike any obstruction. The forward pair of pawls 28 on the carriage C–1 extend slightly higher than the intermediate pair to provide a surface for engaging the pallets as they are fed to the loading station of the molding machine, this being necessary as the track rails 66 are curved back to the horizontal at the molding station of the cinder block machine, see Figure 5. Figure 6 shows the carriage C–1 at its forward elevated position while feeding pallets onto the extended ends 67 of the rails 66 of the molding station. Holding dogs 76 are provided suitably spaced on a rod 77 extending between the left and right guides 16 and 18 to engage the pallets as they feed along the lower track and to keep them from sliding backward toward the supply stack SS, these dogs being omitted from Figure 1 for clarity.

The upper track is of a similar construction to the lower track in that it has a movable carriage C–2 with the same reciprocating motion. Both carriages executing their feeding and return strokes at approximately the same time, but in opposite directions. This means that as the lower carriage C–1 is feeding toward the molding machine M, the upper carriage C–2 is feeding away from the molding machine. The upper track UT as shown in Figure 1, has a pair of longitudinally disposed rails 78 mounted a substantial distance in-board of the left and right guides 16 and 18. These rails 78 are mounted on any conventional form of supporting brackets 80 secured to the guides 16 and 18. Immediately adjacent each rail 78 and slightly outboard thereof are two movable rails 82 which are tied together by a cross member 83 and form part of the upper carriage C–2. Each of the movable rails 82 is provided with a pair of right angle arms 84 extending outwardly across the guides 16 and 18 and downwardly to the roller supporting structure 86. The roller structure 86 rides on horizontal rails 88 along both sides of a parallelogram mechanism similar to that applied to the lower track. The raising and lowering mechanism including a lever 90 non-rotatably mounted on the outer end of each rock shaft 50 with links 92 secured to the ends of the horizontal rails 88. The other ends of the rails 88 are supported by links 94 that are pivotally secured to brackets 96 on the frame F and to lugs 98 depending from the rails.

As shown in Figure 3, when the control cam imparts a to-and-fro motion to the rock shaft 50, the rails 88 are raised and lowered in a parallelogram action by levers 90 and links 94.

To reciprocate the upper carriage C–2, meaning movable rails 82, a pair of links 100 are pivotally secured to lever arms 102 and to the forward edge of a pair of interconnecting bars 104 on the carriage C–2. As the lever arms 102 rotate with the main drive shaft D, the carriage will reciprocate in timed relationship with the shaft along the horizontally disposed rails 78.

The rearward portion of the movable rails 82 are connected by a cross brace 106, see Figure 2, which is an extension of the rearward right angle arms 84. Pivotally mounted on lugs extending from the cross brace 106 is a transverse bar 108 to which is secured a pair of lifting fingers 110. From the position shown in Figure 3, the lifting fingers 110 may rotate clockwise if they are accidentally engaged by any of the molding mechanism; however, any counter-clockwise movement from this position is prevented by lugs 112 so that fingers 110 will support a pallet and cinder blocks placed thereon.

A similar motion to that used in connection with the lower carriage C–1 is also provided in the feeding motions of the upper carriage C–2. Pallets with the green cinder blocks residing thereon are picked up by the lifting finger 110 at the loading station and deposited on the stationary rails 78. These blocks are moved along step by step by the intermittent reciprocating movement of the upper carriage C–2. The movable rails 82 of the carriage C–2 are raised slightly above the stationary rails 78 during the feeding strokes from left to right, see Figure 5, and during the process are lowered slightly below the stationary rails 78 on the return stroke from right to left. The movement imparted to the upper carriage C–2 closely approaches simple harmonic motion, and is diagrammatically illustrated in Figure 8. The control cam 52 has its active surface positioned with relation to the lever arms 102 so that the carriage C–2, see Figure 3, is raised slightly above the stationary rails 78 just prior to the feeding motion of the carriage C–2 from left to right. The cinder blocks will be picked up and deposited by the carriage around the dead center position of the lever arm 102 so that the instant that the carriage C–2 is picking up and depositing blocks, it has virtually no horizontal movement. This same movement with proper timing of the lifting mechanism including cam 52 through follower 54 and rock shaft 50 is embodied in the lower carriage C–1.

In Figure 8, as the crank arm 102 in full lines is in its dead center position, the upper carriage C–2 has reached its extremity of movement to the left. At this point the active face of cam 52 becomes effective against follower 54 to move the same to the right which in turn will elevate the rails 88 and the carriage C–2 so that a load of cinder blocks are picked up from the stationary rails. Shaft D rotates 180° clockwise to the dotted line position of crank 102 and link 100 at which point the carriage C–2 has been moved to its extreme rightward position along the upper track UT. The cam 52 allows the follower to move back to the left so as to lower the carriage C–2 and allow the cinder blocks on pallets to rest on the stationary rails 78. This is the same movement imparted to the lower carriage C–1.

To acquire true simple harmonic motion, a pair of modified scotch yokes 99 such as in Figure 9, are used to reciprocate connecting bars 101. To allow for the vertical movement of the carriage, a pin and slot connecting means 103 is provided between the connecting bars 101 and vertical links 105 connected to the interconnecting bars 104.

Figure 4 illustrates the type of drive used for the pallet feeder. The main drive shaft D is provided with a driven sprocket 114 which is intermittently rotated by a chain 116. The chain is driven by a driving sprocket 118 secured to a countershaft 120, the sprockets 114 and 118 having the same number of teeth. Mounted on the countershaft is a pinion 122 which meshes with a mutilated gear 124, the mutilated gear being driven by the driving means for the molding machine M. The mutilated gear 124 has one less tooth than the pinion 122 so that one complete revolution of the mutilated gear will produce a single revolution of pinion 122. By this arrangement the main drive shaft D will complete one revolution for every revolution of the mutilated gear 124. However, its rotation will be intermittent depending upon the periods during which the teeth of pinion 122 and mutilated gear 124 are engaged. When the mutilated surface of the gear 124 is presented to the gear 122, obviously no rotation of the gear will occur.

The pallet feeder is located adjacent any conventional cinder block molding machine and can be temporarily attached to the frame of the machine if such a procedure is found desirable. The drive of Figure 4 can be accomplished by any suitable gearing as a substitute for the chain 116 and is not restricted to the use of that chain alone. One complete rotation of the mutilated gear 124 corresponds to a complete cycle of the molding machine M. Each time the mutilated gear 124 makes one revolution, the main drive shaft D also makes one revolution. Each revolution of the drive shaft D imparts both a feeding and return stroke to the upper and lower carriages C–2 and C–1. Control cam 52 is positioned on the main drive shaft D so that the parallelogram lifting mechanisms for both carriages will be actuated just prior to the beginning of a feeding stroke and will be de-energized to lower the two carriages at approximately the end of the feeding stroke. During the return strokes of both carriages the parallelogram lifting mechanisms are in their lowered positions so that neither carriage will engage the pallets on the stationary rails.

The specified embodiment shown is only illustrative of the fundamental principle of my invention and should not be interpreted as the only mechanism by which the theme of the invention can be accomplished. Accordingly, the invention is not to be restricted except as by the appended claims.

I claim:

1. In a pallet feeding mechanism wherein pallets are fed to and from a molding mechanism with a molding station where blocks are molded on pallets as they are consecutively presented and removed from the molding station, the improvement including a pair of tracks, one along which pallets are fed to and the other along which pallets are fed from the molding station, a feeding carriage for each track, and power means for intermittently reciprocating both carriages at the same time including a continuously rotating mutilated driving gear, and a driven pinion intermittently rotating and in meshing engagement with said gear, the number of teeth on the pinion exceeding the number of teeth on the gear by one so that one revolution of the gear will cause one revolution of the pinion.

2. In a pallet feeding mechanism wherein pallets are fed to and from a molding mechanism with a molding station for molding blocks on pallets as they are consecutively presented and removed from the molding station: the improvement including a pair of tracks, one along which pallets are fed to and the other along which pallets are fed from the molding station, a movable carriage for each track, and power means for intermittently reciprocating both carriages at the same time including a continuously rotating mutilated driving gear, and a driven pinion intermittently rotating and in meshing engagement with said gear, the number of teeth on the pinion exceeding the number of teeth on the gear by at least one so that one revolution of the gear will cause one revolution of the pinion.

3. The structure of claim 2 in which an extension of the carriage on the track along which pallets are fed from the molding station is constructed so that it will only pivot upwardly from a substantially horizontal position.

4. In a pallet feeding mechanism wherein pallets are fed to and from a molding machine with a molding station where blocks are molded on pallets as they are consecutively presented and removed from the molding station, a feeding device including at least two stationary rails disposed generally horizontally and extending to the molding station, at least two moveable rails disposed along the stationary rails, means for reciprocating the moveable rails horizontally with simple harmonic motion while, at the same time, raising and lowering the rails slightly above and slightly below the stationary rails during the dwell periods of the simple harmonic motion, and an extension on the rails adapted to project into the molding station to pick up the molded blocks on pallets, said extension being constructed to pivot upwardly only from a generally horizontal position.

5. In a device for feeding loaded and unloaded pallets to and from a molding machine which has a molding mechanism defining a molding station where blocks are molded on pallets as they are consecutively presented and removed from the molding station, the feeding device including a pair of tracks, one along which pallets are fed to, and the other along which pallets are fed from the molding station, one track being above the other, a movable carriage for each track, means for reciprocating both carriages at the same time in opposite direction with simple harmonic motion, the carriages having working strokes and return strokes which occur simultaneously, and means for imparting simultaneous vertical movement to the carriages to raise and lower them above and below their tracks, said means being constructed so that vertical movement will only be imparted to the carriages during the dwell period of their simple harmonic motion to provide intermittent cyclical motion to the carriages.

6. In a device for feeding loaded and unloaded pallets to and from a molding machine which has a molding mechanism defining a molding station where blocks are molded on pallets as they are consecutively presented and removed from the molding station, the feeding device including a pair of tracks, one along which pallets are fed to, and the other along which pallets are fed from the molding station, a movable carriage for each track, means for reciprocating both carriages at the same time with simple harmonic motion, the carriages having working strokes and return strokes which occur simultaneously, and means for imparting simultaneous vertical movement to the carriages to raise and lower them above and below their tracks, said means being constructed so that vertical movement will only be imparted to the carriages during the dwell period of their simple harmonic motion to provide intermittent cyclical motion to the carriages.

7. The structure of claim 4 in which the extension on the rails includes at least two spaced fingers pivoted to the forward end of the rails, and a stop mechanism on the rails forward of the fingers' pivot to hold the fingers normally in a generally horizontal position but allowing them to be pivoted upwardly.

8. The structure of claim 5 characterized by and including a loading extension on the upper carriage adapted to project into the molding machine and through the molding station to pick-up the pallets with molded blocks thereon, the loading extension including at least two spaced fingers pivoted to the forward end of the carriage, and a stop mechanism on the carriage forward of the fingers' pivot to hold the fingers normally in a generally horizontal position but allowing them to be pivoted upwardly.

9. In a mechanism for feeding pellets from a molding machine with freshly molded, highly fragile cinder blocks thereon so as to prevent jarring and damage to the blocks, a conveying device including a base, a frame rising above the base, a generally horizontal disposed stationary track on the frame, a carriage mechanism movable along the stationary track reciprocating between an inner molding station at the molding machine and an outer loading station remote from the molding machine, primary actuating means for imparting simple harmonic reciprocatory movement to the carriage mechanism generally in a longitudinal direction back and forth along the track between the inner molding station and the outer loading station, secondary actuating means for imparting limited vertical movement to the carriage mechanism with the freshly molded fragile blocks on pallets thereon, including means for operating the secondary actuating means only at and during the dwell periods of the simple harmonic movement imparted to the carriage mechanism by the primary actuating means to raise the pallets with the freshly molded blocks thereon from the stationary track at the molding station and to deposit the pallets with freshly molded blocks on the stationary track at the remote loading station, and a synchronizing unitary driving means interconnecting the primary and secondary actuating means constructed so that they will operate in a predetermined, intermittent, timed cyclical relationship to raise and lower the fragile blocks on the pallets from and to the stationary track so that the blocks will remain intact and will not be severely jarred when either picked-up or deposited.

References Cited in the file of this patent

UNITED STATES PATENTS

| | | |
|---|---|---|
| 337,863 | Petrie et al. | Mar. 16, 1886 |
| 863,841 | George | Aug. 20, 1907 |
| 1,031,058 | Edwards et al. | July 2, 1912 |
| 1,340,824 | Crozier | May 18, 1920 |
| 1,400,367 | McCann | Dec. 13, 1921 |
| 1,597,961 | Farkas | Aug. 31, 1926 |
| 1,921,003 | Romie | Aug. 8, 1933 |

FOREIGN PATENTS

| | | |
|---|---|---|
| 585,778 | Great Britain | Feb. 24, 1947 |